United States Patent
Yoneyama

(10) Patent No.: US 6,337,936 B1
(45) Date of Patent: Jan. 8, 2002

(54) OPTICAL AMPLIFIER, AND METHOD AND APPARATUS FOR MONITORING AN OPTICAL FIBER TRANSMISSION PATH

(75) Inventor: Kenichi Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/505,774

(22) Filed: Feb. 17, 2000

(30) Foreign Application Priority Data

Feb. 18, 1999  (JP) ............................................. 11-040673

(51) Int. Cl.[7] ................................................. G02B 6/28
(52) U.S. Cl. ............................... 385/24; 385/37; 385/46
(58) Field of Search .............................. 385/24, 46, 37, 385/47, 12, 49, 88, 123; 359/341, 333; 372/70, 102

(56) References Cited

U.S. PATENT DOCUMENTS 6,233,090 B1 * 5/2001 Fukaishi .................. 359/341 X

OTHER PUBLICATIONS

Sato et al., "OTDR in Optical Amplifier Transmission Systems using EDFAs Containing Optical Circulators", Proceedings of the Autumn Convention of the Institute of Electronics, Information and Communication Engineers of Japan, B–619, 1991.

Horiuchi et al., "Highly Accurate Fault Localization Over 4580 km Optical Amplifier System using Coherent Rayleigh Backscatter Refectometry", ECOC '93, MoCL. Sep. 3, 1993.

Okada et al., "Backscattering Measurement and Fault Location in Optical Fibers", The Journal of the Institute of Electronics, Information and Communication Engineers of Japan, vol. J63–B No. 2, Feb. 1998.#jf139##

*Primary Examiner*—Phan T. H. Palmer
(74) *Attorney, Agent, or Firm*—McGinn & Gibb, PLLC

(57) ABSTRACT

An optical amplifier comprises an optical circulator and an optical fiber grating connected to this. The optical fiber grating reflects a backscattered light of a probe light coming back from an optical fiber transmission path. The optical circulator returns this reflected light through said optical fiber transmission path to an optical receiver. A method for monitoring an optical fiber transmission path comprises a step of sending out a probe light having a specific wavelength to an optical fiber transmission path, a step of selecting a backscattered light of this probe light, and a step of receiving this light through said optical fiber transmission path and measuring a time change in level of this light.

20 Claims, 8 Drawing Sheets

OPTICAL AMPLIFIER, AND METHOD AND APPARATUS FOR MONITORING AN OPTICAL FIBER TRANSMISSION PATH

BACKGROUND OF THE INVENTION

1. Field of the Invention

The present invention relates to an optical amplifier and relates a method and an apparatus for monitoring an optical fiber transmission path, and more particularly to fault localization of an optical fiber transmission path using an optical time domain reflectometry (hereinafter, referred to as OTDR).

2. Description of the Related Prior Art

As one of methods for localizing a fault in an optical fiber transmission path, an OTDR is publicly known (THE JOURNAL OF THE INSTITUTE OF ELECTRONICS, INFORMATION AND COMMUNICATION ENGINEERS OF JAPAN, Vol.J63-B No.2, February 1998). The OTDR is a method for observing the state of an optical fiber, comprising a step of inputting a short pulse light into the optical fiber and a step of measuring a time distribution of the level of a backscattered light returned by Rayleigh scattering occurring in the optical fiber.

A conventional optical amplification relay transmission system to which an OTDR is applied is provided with an optical transmission path comprising a pair of optical fibers which are respectively an up optical fiber and a down optical fiber. This optical fiber transmission path has an optical amplifier apparatus provided with an optical amplifier for amplifying an up signal light and an optical amplifier for amplifying a down signal light. This optical fiber transmission path is provided between end stations performing transmission and reception of signal lights. The end station is provided with a transmitter and a receiver for a probe light of an optical fiber. An optical amplifier as described above is ordinarily provided with an optical isolator in order to prevent a returning light generated by reflection at the output side. Accordingly, this optical isolator prevents every returning light including a backscattered light. The optical amplifier is therefore provided with an optical bypass circuit which is composed of two optical couplers and connects an up and a down optical fiber transmission path (Y. Horiuchi et. al. ECOC '93, MoCl.3, September 1993, and Proceedings of the Autumn Convention of the Institute of Electronics, Information and Communication Engineers of Japan, B-619, 1991). A returning light coming back through an up optical fiber transmission path is separated by an optical coupler before an optical amplifier and is inserted into a down optical fiber transmission path by another optical coupler. This returning light is returned to an end station through the down optical fiber transmission path, is separated by an optical coupler inside the end station, and received. At this time, only the wavelength component of a probe light is selected and received. The backscattered light of the probe light out of the received light is measured. A time change in level of the backscattered light is represented as shown by a dashed line in a graph of FIG. 7. On the basis of this result, a fault of an optical fiber between the optical amplifier apparatuses in the up optical fiber transmission path is measured.

As described above, in an optical relay transmission system using a conventional optical amplifier, a returning light from an up optical fiber transmission path passes through two optical couplers and is inputted into an opposite down optical fiber transmission path and comes back to an end station. Since loss of the returning light in the optical couplers is very large, the level of a backscattered light to be received is very small and it is difficult to observe the optical fiber in high accuracy. And a conventional fault localization method needs an opposite optical fiber transmission path.

SUMMARY OF THE INVENTION

Accordingly, an object of the present invention is to provide a simple apparatus and method capable of performing a high-accuracy fault localization of an optical fiber transmission path and an optical amplifier used in this apparatus.

An optical amplifier of the present invention comprises a light amplifying portion for amplifying an input light, an optical circulator provided at the output side of it, and a wavelength selectively reflecting device connected to this optical circulator. In this optical amplifier, the optical circulator sends returning lights to the wavelength selectively reflecting device, which reflects a returning light having a specific wavelength. This reflected light is returned to the light amplifying portion. A method for localizing a fault in an optical fiber transmission path comprises the following steps; that is to say, a step of sending out a probe light having a specific wavelength into an optical fiber transmission path, a step of selecting a returning light of the said probe light by means of an optical circulator arranged in the optical fiber transmission path and a wavelength selectively reflecting device connected to this optical circulator, and a step of receiving the returning light of the probe light through the optical fiber transmission path. After this, a time change in level of a backscattered light in the returning light is observed. An apparatus for monitoring an optical fiber transmission path comprises a light source for outputting a probe light having a specific wavelength, an optical receiver for receiving a returning light of the probe light, an optical coupler for coupling the optical fiber transmission path with the light source and the optical receiver, and an optical amplifier arranged in the optical fiber transmission path. The optical amplifier is provided with a light amplifying portion, an optical circulator provided at the output side of the light amplifying portion, and a wavelength selectively reflecting device connected to this optical circulator. The wavelength selectively reflecting device reflects selectively a returning light of a probe light, and the optical circulator outputs this reflected light to an optical fiber transmission path. An optical fiber transmission system comprises end stations transmitting and receiving signal lights, an optical fiber transmission path provided between the said end stations, and the above-mentioned optical amplifier apparatuses provided in the said optical fiber transmission path. The end station comprises a light source outputting the above-mentioned probe light having a specific wavelength, an optical receiver for receiving a returning light of this probe light, and an optical coupler for coupling the optical fiber transmission path with the light source and the optical receiver. A light amplifying portion in said optical amplifier is provided with a rare-earth-doped optical fiber, a pumping light source, and an optical coupler for inputting an excitation light into the rare-earth-doped optical fiber. The wavelength selectively reflecting device is selected from an optical fiber grating, a grating substrate, and a waveguide grating. In the above-mentioned invention, it is possible to localize a fault in an optical fiber transmission path in high accuracy by means of a simple apparatus.

BRIEF DESCRIPTION OF THE DRAWINGS

The above and other objects, features and advantages of the present invention will become apparent from the fol

DETAILED DESCRIPTION OF THE PREFERRED EMBODIMENTS

Figure 1:
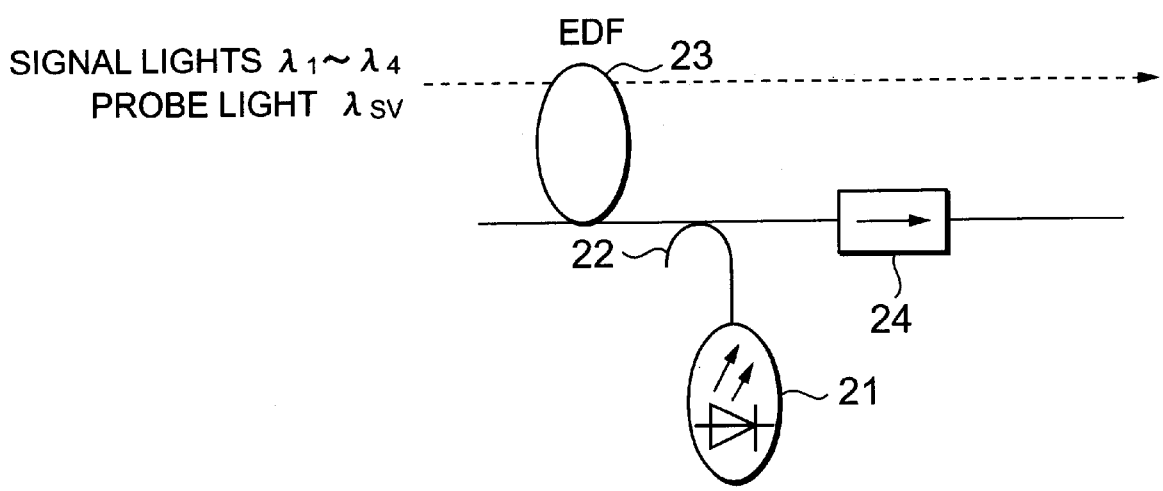
- FIG. 1 is a block diagram of a conventional optical amplifier.
Figure 2:
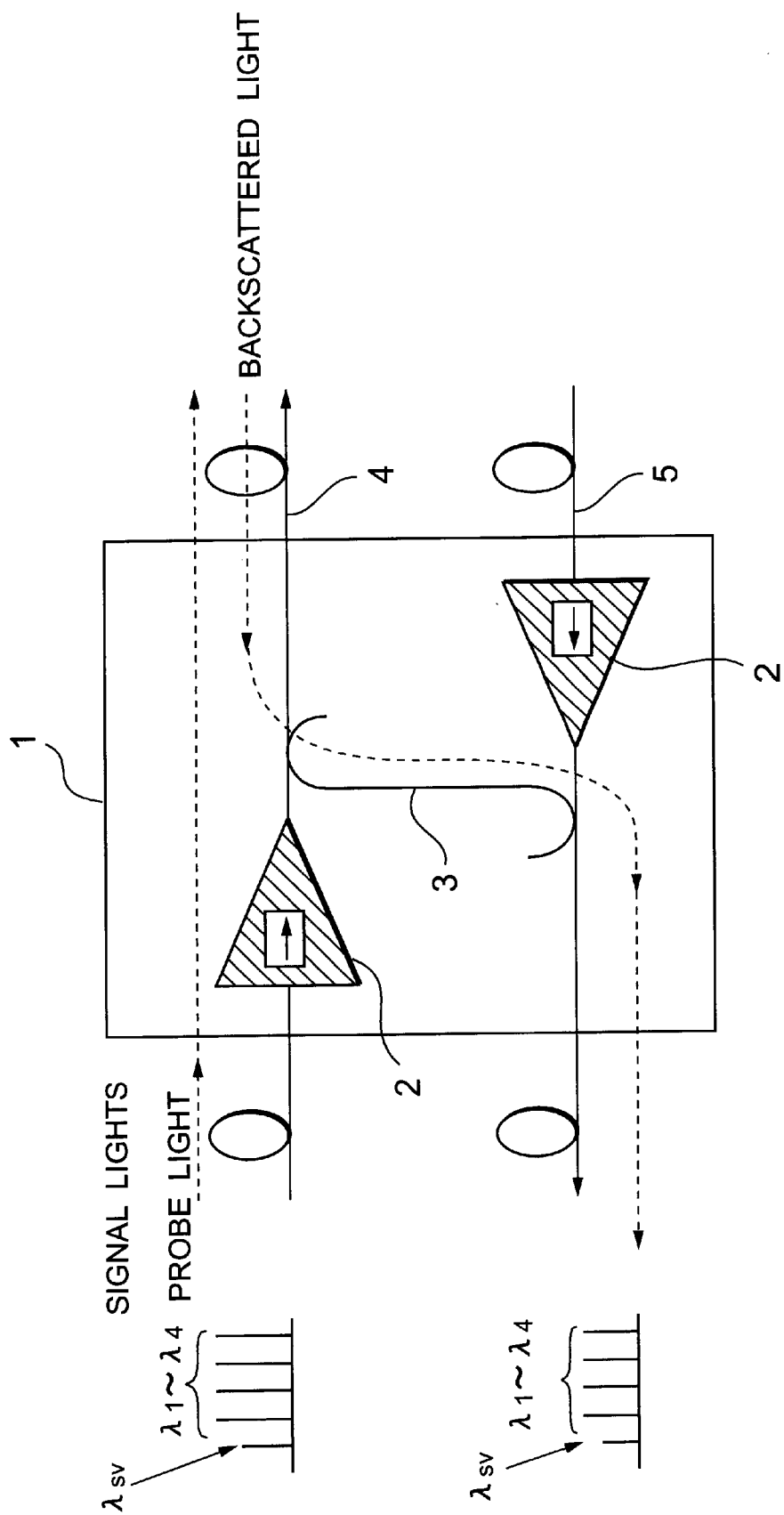
FIG. 2 is a block diagram of a conventional optical amplifier provided in an optical fiber transmission path.
Figure 3:
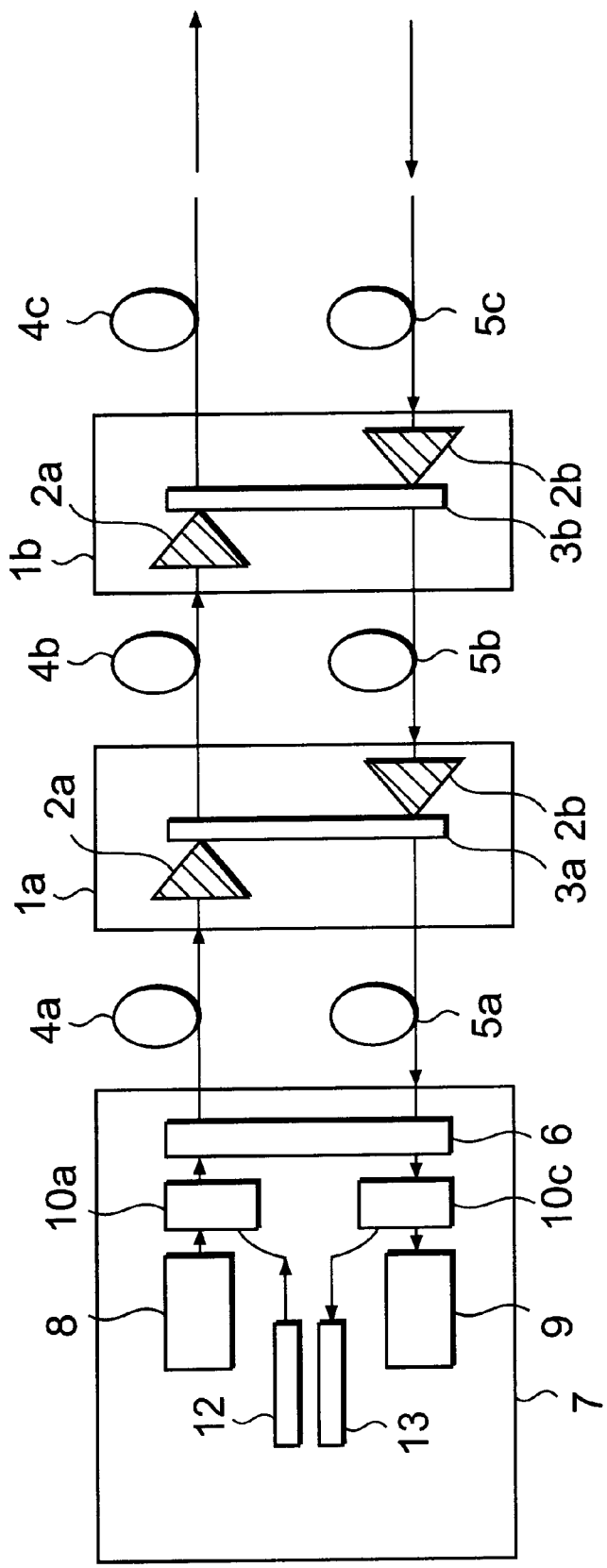
FIG. 3 is a block diagram of a conventional optical fiber fault localizing apparatus.

In a conventional optical amplifier shown in FIG. 1, an excitation light outputted from a pumping light source 21 excites an erbium-doped fiber (hereinafter, referred to as EDF) 23 with an optical coupler 22. The EDF 23 in an excited state amplifies and outputs a signal light inputted. An optical isolator 24 prevents a returning light from the output side from entering the EDF 23. Thanks to this, the amplifying operation of the EDF 23 is stabilized. As shown in FIG. 2, a conventional optical amplifier apparatus 1 provided in an optical fiber transmission path is composed of optical amplifiers 2 provided respectively in an up optical fiber transmission path 4 and a down optical fiber transmission path 5. An optical bypass circuit 3 for introducing a returning light from the up optical fiber transmission path into the down optical fiber transmission path is provided inside this optical amplifier apparatuses 1. The optical bypass circuit 3 is formed by connecting optical couplers respectively provided in the optical fiber transmission paths 4 and 5. A returning light in the up optical fiber transmission path passes through this optical bypass circuit 3 and returns to an end station 7. The returning light includes a background light of signal lights(of λ1 to λ4 in wavelength) and a probe light(of λsv in wavelength). In a conventional optical amplification relay transmission system, as shown in FIG. 3, the end station 7 is provided with an optical transmitter 8 and an optical receiver 9 for transmitting and receiving main signal lights, a light source 12 and an optical receiver 13 for a probe light, an optical coupler 10a for multiplexing the probe light and the main signal lights, an optical coupler 10c for separating returning lights, and an optical bypass circuit 6. A returning light from an up optical fiber transmission paths 4b, 4c passes through optical bypass circuits 3a, 3b respectively and enters a down optical fiber transmission path, and is received through the optical coupler 10c. A time change in level of a backscattered light contained in the returning light is measured. A result of this measurement is shown by the dashed line in the graph of FIG. 7.

Figure 4:
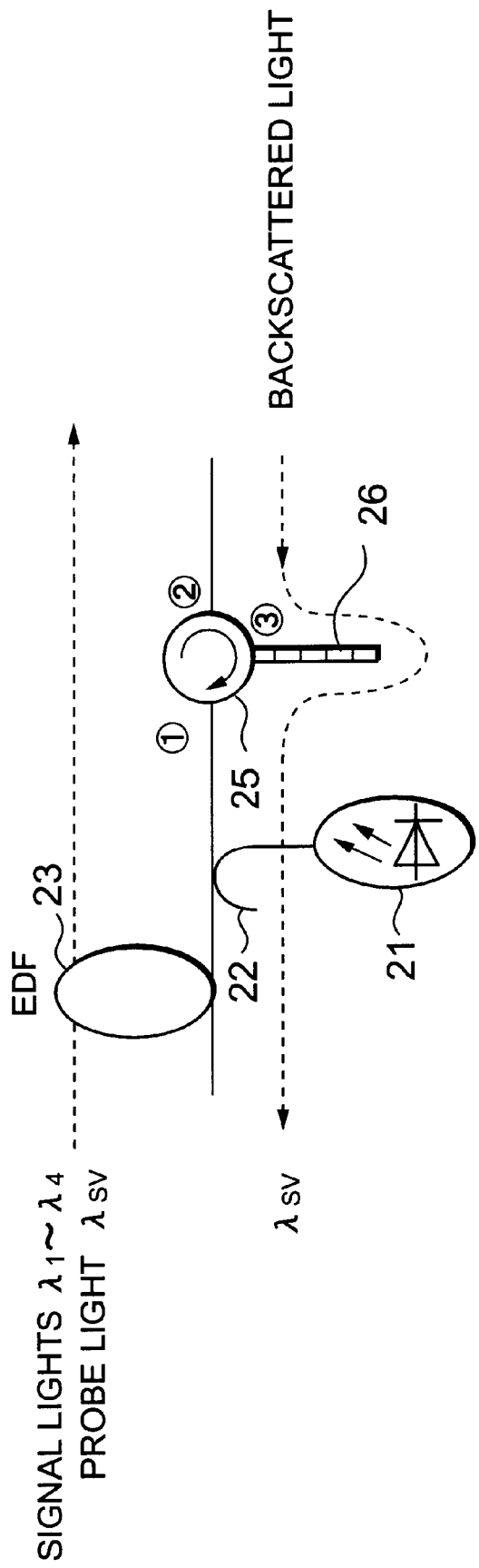
FIG. 4 is a block diagram of an example of an optical amplifier provided in an optical fiber of the present invention.

Referring to FIG. 4, in an optical amplifier of the present invention, its light amplifying portion is provided with an EDF 23 and a pumping light source 21, and a port (1) of an optical circulator 25 is connected to the output side of the amplifying portion. A port (2) of the optical circulator 25 is connected to an optical fiber transmission path, and a port (3) is connected to an optical fiber grating 26. Four main signal lights (of λ1 to λ4 in wavelength) and a probe light (of λsv in wavelength) are amplified by the EDF 23, are inputted into the port (1) of the optical circulator 25, and are outputted through the port (2) to the up optical transmission path. A returning light coming back through this transmission path is sent from the port (2) of the optical circulator 25 to the port (3), and enters the optical fiber grating 26. This returning light is mainly composed of backscattered lights of the main signal lights and the probe light. A reflected light by Fresnel reflection caused by a refraction index difference at an end face and the like of an optical fiber may be contained. Since the optical fiber grating 26 reflects only the component of λsv in wavelength of the probe light, only the returning light of the probe light is sent from the port (3) of the optical circulator 25 to the port (1), and is outputted to the EDF 23. This returning light is amplified by the EDF 23 and then is propagated to the end station along the up optical fiber transmission path in the opposite direction to the signal lights.

Figure 5:
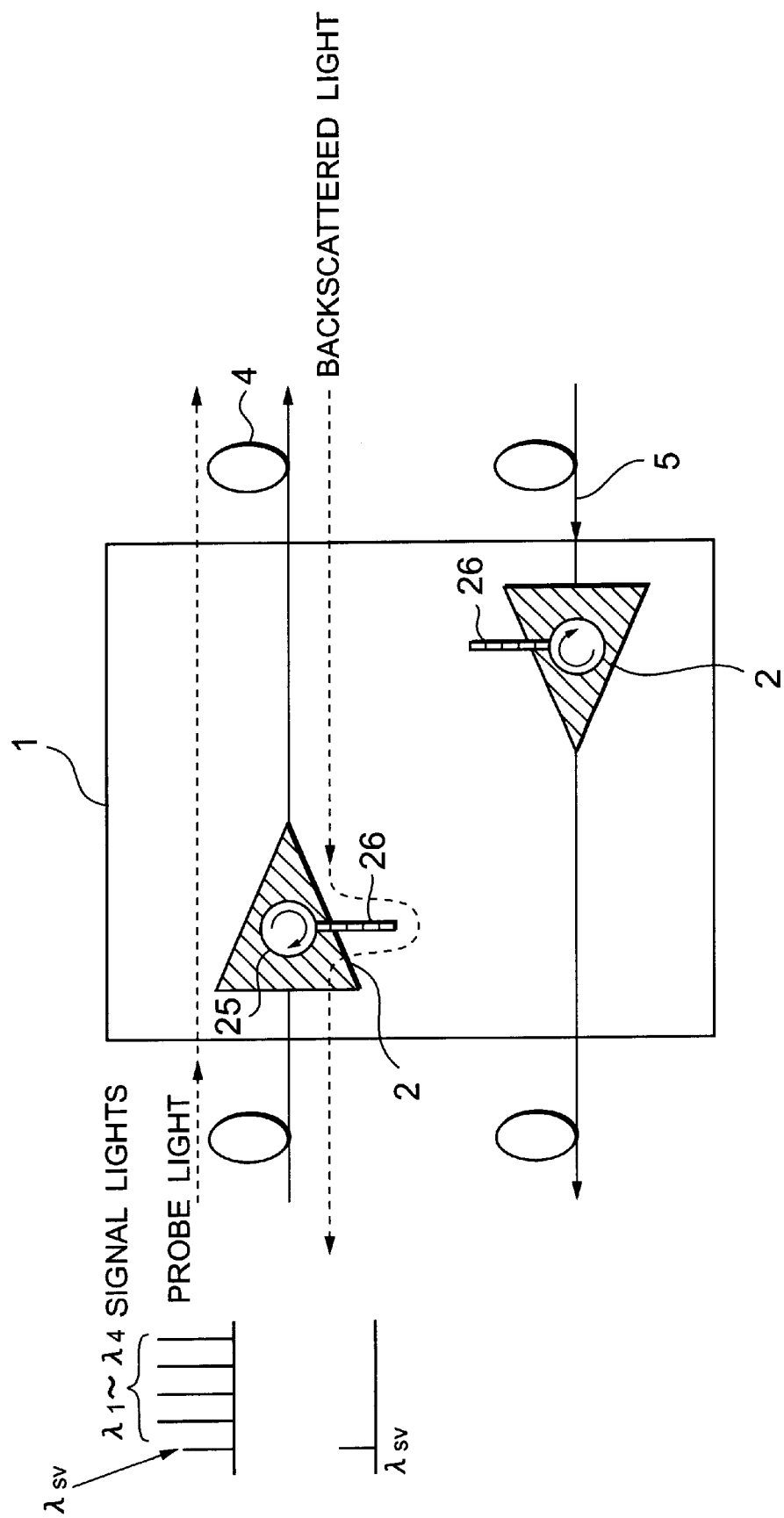
FIG. 5 is a block diagram of an example of an optical amplifier provided in an optical fiber transmission path.

With reference to FIG. 5, in case that the above-mentioned optical amplifier is applied to an optical amplification relay transmission system, optical amplifiers 2 are provided independently of each other respectively in up and down optical fiber transmission paths 4 and 5. A path for connecting these optical fiber transmission paths 4 and 5 to each other is not provided. A returning light of a probe light (of λsv in wavelength) generated inside the up optical fiber transmission path 4 is not introduced into the down optical fiber transmission path 5, but passes through the optical amplifier of the up optical fiber transmission path 4 and returns to the end station 7. The same operation is performed also in the down optical fiber transmission path 5. The wavelength λsv of the probe light is different from the wavelengths λ1 to λ4 of the main signal lights and is selected as a wavelength within a bandwidth capable of being amplified by an EDF 25.

Figure 6:
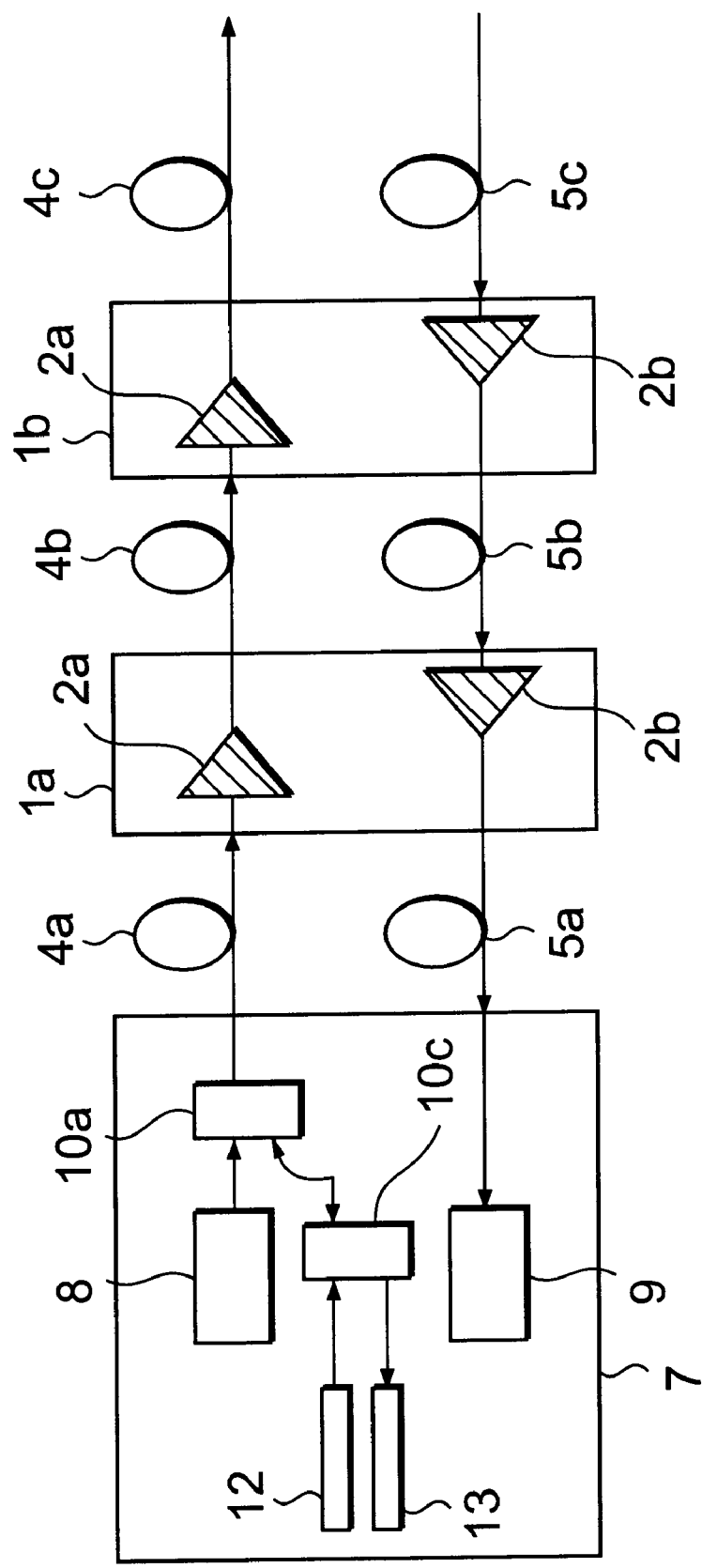
FIG. 6 is a block diagram of an optical fiber fault localizing apparatus of the present invention.

With reference to FIG. 6, the end station 7 is provided with a light source 12 and an optical receiver for a probe light, and an optical transmitter 8 and an optical receiver 9 for a main signal light. Further, it is provided with optical couplers 10a and 10c for coupling the light source 12 and optical receiver 13 to the up optical fiber transmission path. FIG. 6 does not show a control circuit for controlling these devices. Each of optical amplifiers 1a and 1b is provided with the optical amplifiers 2a and 2b respectively in the up and down optical fiber transmission paths. In case of performing a fault localizing operation for an optical fiber transmission path, the light source 12 outputs pulses of a probe light (of λsv in wavelength), and the optical couplers 10a and 10c multiplex and output this probe light and the main signal light to an up optical fiber transmission path 4a. It is possible also to perform a fault localization by sending a probe light alone. The optical amplifier 2a selects and amplifies the wavelength component of the probe light from a returning light coming back from each optical fiber. The above-mentioned optical couplers 10a and 10c divide and send this light to the optical receiver 13. The state of each of the optical fibers 4a, 4b, 4c and the like is measured on the basis of a time change in level of a backscattered light of the probe light in a returning light received. The returning light from the optical fiber 4a contains also a backscattered light of the main signal light because the returning light does not pass through any optical amplifier. In case of performing a fault localization for the optical fiber 4a, therefore, only the probe light is sent to this optical fiber. Or a device selecting only the wavelength component of a probe light (for example, an optical band pass filter, or an optical circulator, an optical fiber grating and the like as described above) is provided at a specified position inside the end station.

Figure 7:
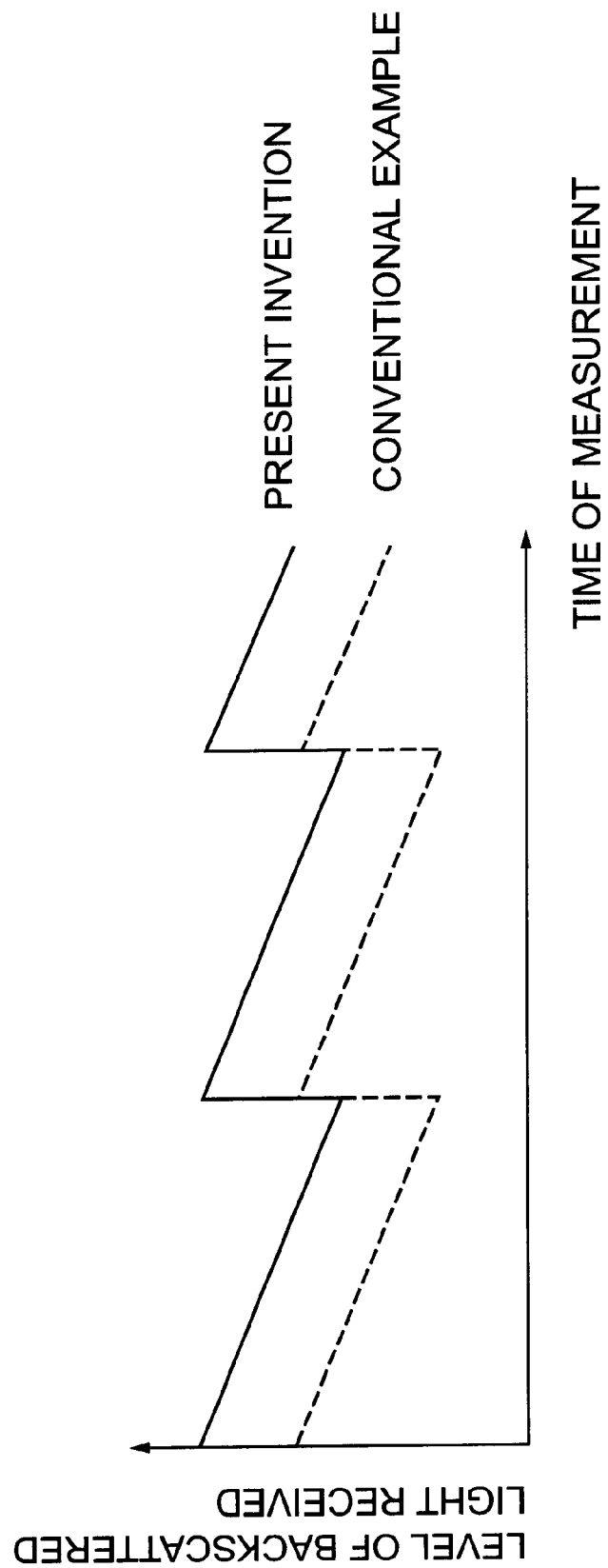
FIG. 7 is a graph of a time change in level of a backscattered light.

With reference to FIG. 7, the level of a backscattered light of a probe light shown in the graph displays a saw tooth waveform. A backscattered light from the nearest optical fiber to the optical receiver 13 is earliest received. The farther optical fiber from the optical receiver has the longer returning time of its backscattered light. In the graph, the solid line shows a characteristic of the present invention and the dashed line shows a characteristic of a conventional method. According to the present invention, the backscattered light of a probe light suffers only a little loss caused by the optical circulator 25 and the optical fiber grating 26. Further, since the EDF 23 amplifies this backscattered light, the level of this light received by the end station is 10 dB or more higher than a conventional example. It is therefore possible to make a high-accuracy observation of an optical fiber transmission path.

Figure 8:
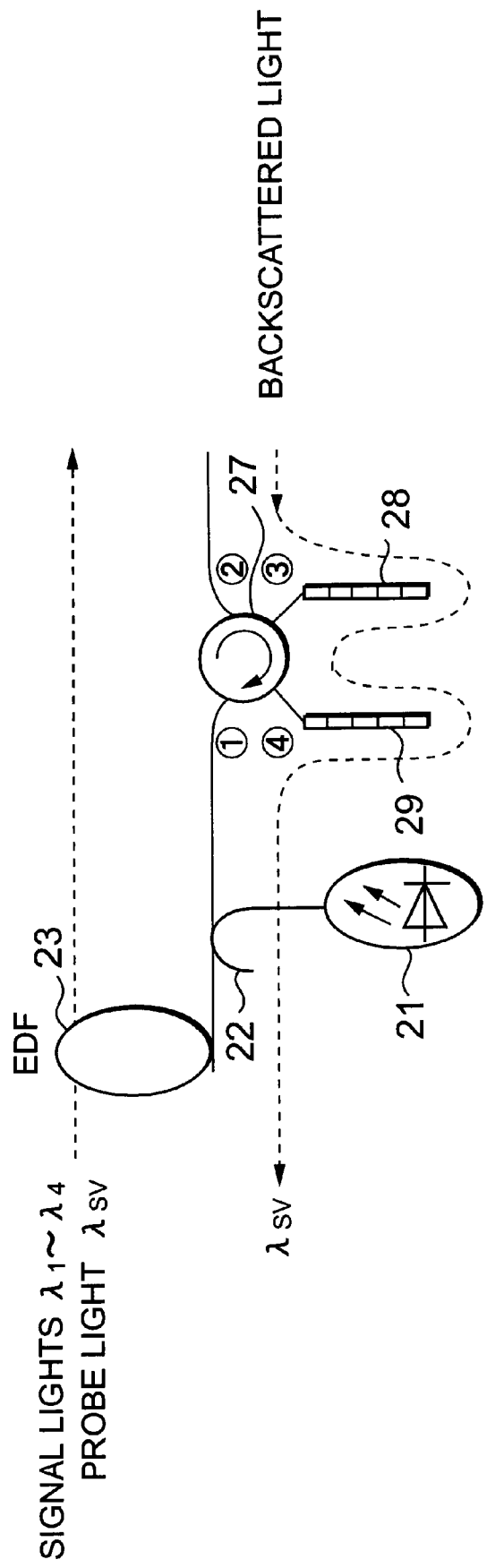
FIG. 8 is a block diagram of another example of an optical amplifier of the present invention.

With reference to FIG. 8, an example is shown in which a 4-port optical circulator 27 is applied to an optical amplifier. This optical circulator 27 has two optical fiber gratings 28 and 29 each reflecting the wavelength component of a probe light connected respectively to two ports (3) and (4). These two optical fiber gratings improve the wavelength selectivity and suppress the crosstalk of a signal light. The circulator may have more than two wavelength selectively reflecting devices.

The composition of the above-mentioned optical amplifier can be applied to a booster amplifier of a non-relay transmission system. Even in a very long distance non-relay optical transmission system, therefore, it is possible to measure in high sensitivity an optical fiber transmission path to the far end of the optical fiber.

As a reflecting device of a wavelength selecting type, it is possible to utilize a substrate-type grating and a waveguide-type grating in addition to an optical fiber grating.

A method and an apparatus for localizing a fault in an optical fiber according to the present invention can localize a fault in an optical fiber in high accuracy by means of a simple apparatus, and do not need an opposite optical fiber transmission path.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical amplifier for amplifying a light propagating in an optical fiber transmission path, comprising:
    a light amplifying portion for amplifying an input light;
    an optical circulator provided at the output side of said light amplifing portion; and
    a wavelength selectively reflecting device which is connected to said optical circulator and reflects a light having a specific wavelength,
    wherein said optical circulator sends a returning light to said wavelength selectively reflecting device which reflects said returning light, and
    wherein a reflected returning light is input to said light amplifying portion.

2. An optical amplifier according to claim 1, wherein said light amplifying portion comprises a rare-earth-doped optical fiber, a pumping light source, and a coupler for inputting an excitation light into said rare-earth doped optical fiber.

3. An optical amplifier according to claim 1, wherein said optical circulator is connected to two or more wavelength selectively reflecting devices.

4. An optical amplifier according to claim 1, wherein said wavelength selectively reflecting device comprises one of an optical fiber grating, a grating device selected from an optical fiber grating, a grating substrate and a waveguide grating.

5. An optical amplifier according to claim 1, wherein said returning light comprises a probe light.

6. An optical amplifier according to claim 1, wherein said optical circulator comprises a first port connected to an output side of said light amplifying portion, a second port connected to said optical fiber transmission path, and a third port connected to said wavelength selectively reflecting device.

7. A method for monitoring an optical fiber transmission path, comprising:
    sending out a probe light having a specific wavelength to the optical fiber transmission path;
    inputting a returning light of said probe light into an optical circulator provided in the optical fiber transmission path;
    reflecting said returning light of said probe light using a wavelength selectively reflecting device connected to said optical circulator;
    amplifying a reflected returning light of said probe light; and
    receiving said reflected returning light of said probe light through said optical fiber transmission path.

8. A monitoring method according to claim 7, wherein said receiving the returning light comprises measuring a time change in level of the backscattered light of a probe light contained in said received light.

9. A monitoring method according to claim 7, wherein said reflected returning light of said probe light is amplified by a light amplifying portion provided in said optical fiber transmission path.

10. A monitoring method according to claim 9, wherein said light amplifying portion comprises a rare-earth-doped optical fiber, a pumping light source, and a coupler for inputting an excitation light into said optical fiber.

11. A monitoring method according to claim 7, wherein said sending out a probe light comprises sending out a probe light together with a main signal light.

12. A monitoring method according to claim 7, wherein said returning light of said probe light is output from said optical circulator into the wavelength selectively reflecting device which selectively reflects said returning light of said probe light.

13. A monitoring method according to claim 12, wherein said wavelength selectively reflecting device comprises one of an optical fiber grating, a grating substrate and a waveguide grating.

14. An apparatus for monitoring an optical fiber transmission path, comprising:
    a light source for outputting a probe light having a specific wavelength,
    an optical receiver for receiving a returning light of said probe light,
    an optical coupler for coupling an optical fiber transmission path to said light source and said optical receiver, and
    an optical amplifier arranged in said optical fiber transmission path, comprising a light amplifying portion;

an optical circulator provided at the output side of said light amplifying portion; and a wavelength selectively reflecting device connected to said optical circulator, wherein said wavelength selectively reflecting device reflects selectively a returning light of said probe light, and said optical circulator sends out this reflected light to said light amplifying portion.

15. An apparatus for monitoring an optical fiber transmission path according to claim 14, wherein said wavelength selectively reflecting device comprises one of an optical fiber grating, a grating substrate and a waveguide grating.

16. An apparatus for monitoring an optical fiber transmission path according to claim 14, wherein said optical transmitter and said optical receiver are arranged inside an end station for transmitting and receiving signal lights.

17. An apparatus for monitoring an optical fiber transmission path according to claim 14, wherein said optical receiver measures a time change in level of a backscattered light of said probe light.

18. An apparatus for monitoring an optical fiber transmission path according to claim 14, wherein said light amplifying portion comprises a rare-earth-doped optical fiber, a pumping light source, and a coupler for inputting an excitation light into said optical fiber.

19. An optical fiber transmission system comprising:

end stations for transmitting and receiving signal lights;

an optical fiber transmission path provided between said end stations; and an optical amplifier provided in said optical fiber transmission path;

wherein each said end station comprises a light source for outputting a probe light having a specific wavelength;

an optical receiver for receiving a returning light of said probe light; and an optical coupler for coupling said optical fiber transmission path with said light source and said optical receiver, wherein said optical amplifier comprises a light amplifying portion;

an optical circulator provided at the output side of said light amplifying portion; and a wavelength selectively reflecting device connected to said optical circulator, and wherein said wavelength selectively reflecting device reflects selectively a returning light of said probe light, and said optical circulator sends out this reflected light to said light amplifying portion.

20. An optical fiber transmission system according to claim 19, wherein said optical receiver measures a time change in level of a backscattered light of said probe light.

* * * * *